Nov. 1, 1949.  H. BENDER  2,486,458
LAWN EDGER

Filed April 23, 1947  2 Sheets-Sheet 1

Inventor
Hugo Bender

By *Clarence A. O'Brien and Harvey B. Jacobson*
Attorneys

Nov. 1, 1949. H. BENDER 2,486,458
LAWN EDGER
Filed April 23, 1947 2 Sheets-Sheet 2
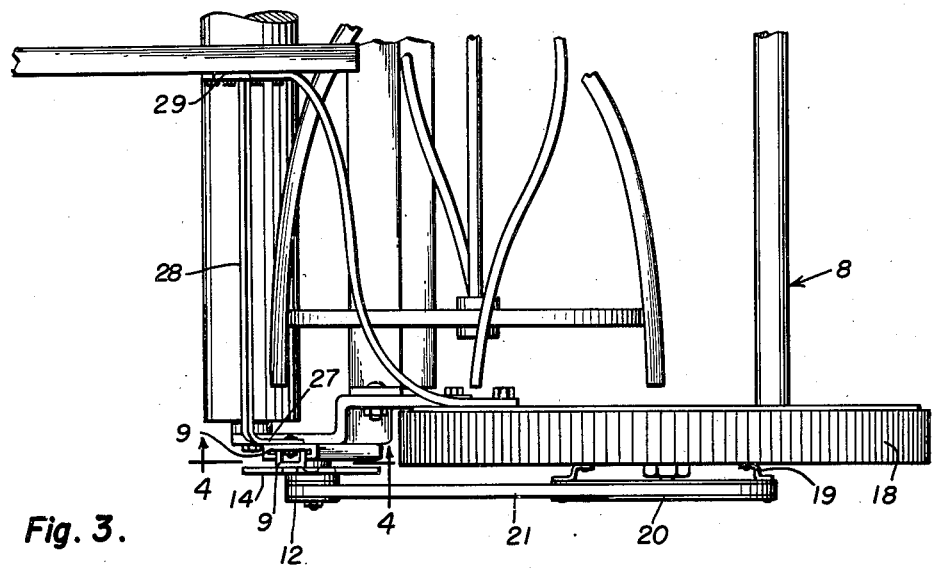
Fig. 3.
Fig. 5.
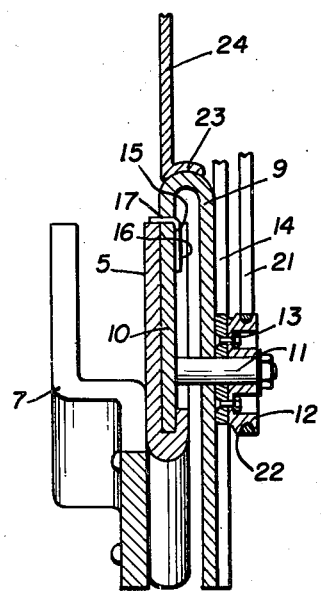
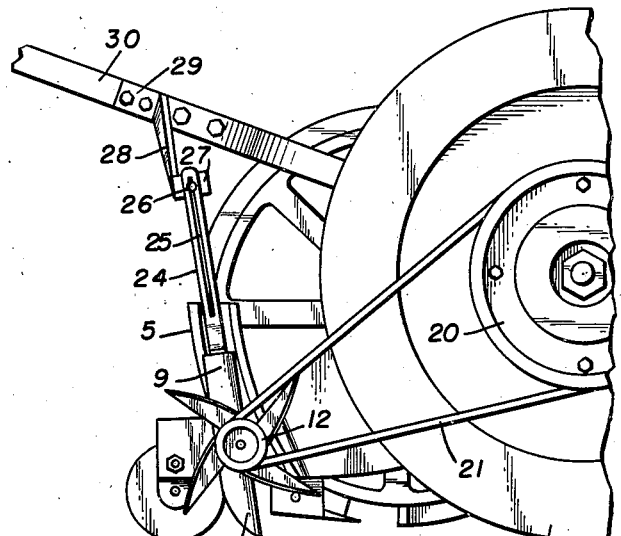
Fig. 6.
Inventor
Hugo Bender
By *Clarence A. O'Brien and Harvey B. Jacobson*
Attorneys

UNITED STATES PATENT OFFICE 2,486,458

LAWN EDGER

Hugo Bender, Houston, Tex.

Application April 23, 1947, Serial No. 743,257

2 Claims. (Cl. 56—251)

This invention relates to new and useful improvements in lawn edgers and the primary object of the present invention is to provide an attachment for lawn mowers comprising a frame and a rotary cutting blade carried by the frame which is connected to one of the mower wheels for rotation of the blade with the mower wheels.

Another important object of the present invention is to provide a frame of the character referred to including a rotary blade supporting member, which is adjustably connected to the mower handle for positioning of the blade relative to the ground surface.

A further purpose of the present invention is to provide a device of the class described comprising a rotary blade operatively connected to one of the mower wheels and adapted to follow said wheel for edging a lawn adjacent a walk.

A still further purpose of the present invention is to provide a lawn edger of the character described which is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a top plan view thereof;

Figure 5 is an enlarged sectional view taken on line 5—5 of Figure 1; and

Figure 6 is a similar view of Figure 1 showing the cutting blade in a lowered position.

Figure 1:
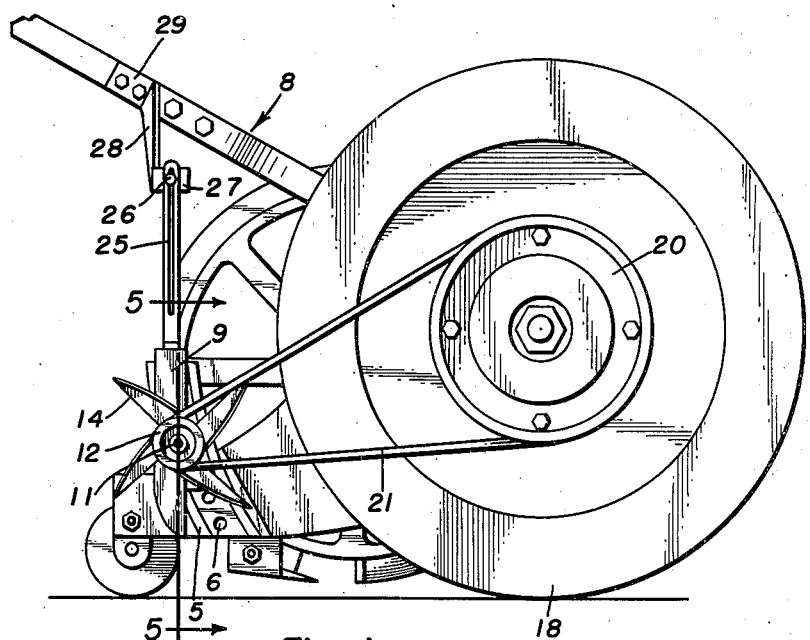
Figure 1 is a side elevational view showing the edging device attached to a lawn mower with the cutting blade of the edging device in a raised position.
Figure 2:
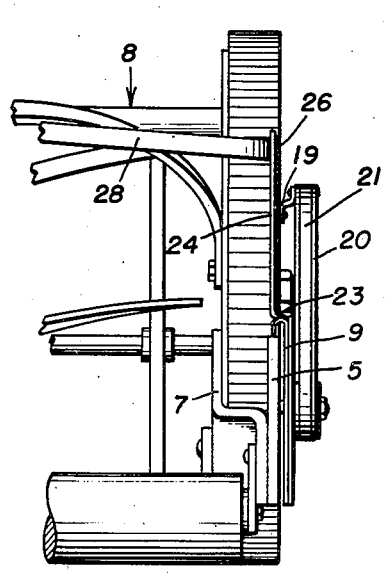
Figure 2 is a rear elevational view showing the edging device attached to a lawn mower, shown in part.

Referring now to the drawings in detail, wherein for the purpose of illustration, I have disclosed a preferred embodiment of the present invention, the numeral 5 represents an arcuate bracket substantially channel shaped in cross section, and having a plurality of openings 6 at one end. This end is suitably fastened to one of the roller supporting frames 7 of a conventional lawn mower 8, by removable fastening means, whereby the bracket may be adjusted vertically relative to the roller supporting frame.

A suitably U-shaped shaft supporting frame 9, has one leg 10 adapted to fit downwardly into bracket 5.

Welded or otherwise suitably secured to this leg 10 and extending horizontally outwardly through the adjacent leg of frame 9, is a fixed shaft 11, on which is journaled a hub 12, to which is secured by fastening means 13 a rotary cutter blade 14.

A substantially inverted L-shaped locking catch 15 is pivoted as at 16 to the inner face of leg 10 and one end of the catch extends outwardly through a slot 17 in the leg 10 and is adapted to bear on the upper edge of bracket 5, for supporting the frame in position on the said bracket 5.

Figure 4:
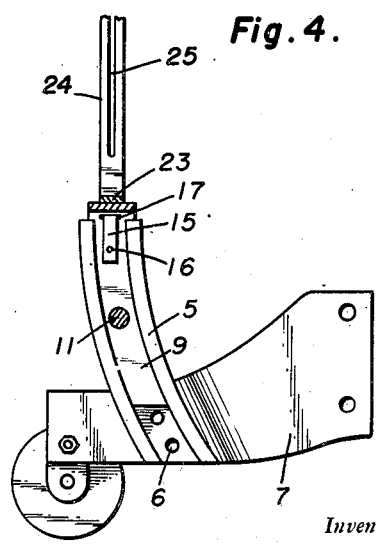
Figure 4 is a sectional view taken on line 4—4 of Figure 3.

Suitably secured to one of the wheels 18 of the mower 8, are brackets 19 to which is secured a vertically disposed pulley 20 spaced outwardly from wheel 18, as more clearly shown in Figure 4 of the drawings.

An endless belt 21 encircles pulley 20 and an annular groove 22 in hub 12, causing a like rotation of hub 12 with the wheel 18 of the mower.

Welded or otherwise suitably secured to frame 9 is the out turned end 23 of an upwardly extending connecting bar 24, having an elongated slot 25.

This bar 24 is adjustably connected by fastening means 26 to a perch 27 of an outwardly and downwardly inclined arm 28 integrally formed with a bracket 29, which is detachably mounted on the handle 30 of the lawn mower.

In an unused position, the frame 9 is easily adjusted upwardly by fastening means 26 which permits the positioning of blade 14 relative to the ground surface.

In order to adjust the blade 14 in position to the ground surface it is merely necessary to loosen fastening means 26 and extend the connecting arm 24 downwardly, which positions the frame 9 in the bracket 5.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A lawn edger comprising a frame, a supporting bracket carried by a lawn mower and detachably connected to the frame, a shaft carried by the frame, a rotary blade journaled on the shaft, drive means connecting the shaft to one of the mower wheels for rotation of the shaft by the said wheels, and adjustable connecting means between the frame and the mower handle for vertical adjustment of the frame relative to a ground surface.

2. A lawn edger comprising a frame, a supporting bracket carried by a lawn mower and detachably connected to the frame, said bracket having an upper edge, a shaft carried by said frame, a rotary blade journaled on the shaft, drive means connecting the shaft to one of the mower wheels for rotation therewith, a U-shaped frame having one leg slidably carried by said bracket, and a substantially L-shaped locking catch pivoted to said one leg of said U-shaped frame, said one leg of said U-shaped frame having a slot for receiving the free leg of said catch, the free leg of said catch bearing against the upper edge of said bracket for supporting said U-shaped frame relative to said bracket.

HUGO BENDER.

REFERENCES CITED

The following references are of record in the file of this patent:

UNITED STATES PATENTS

| Number | Name | Date |
|---|---|---|
| 431,836 | Bockus | July 8, 1890 |
| 1,000,028 | Lindsey | Aug. 8, 1911 |
| 1,522,129 | Jones | Jan. 6, 1925 |
| 2,158,580 | Houser | May 16, 1939 |
| 2,185,659 | Chernow | Jan. 2, 1940 |